United States Patent
Liu et al.

(10) Patent No.: US 10,057,148 B2
(45) Date of Patent: Aug. 21, 2018

(54) DATA-DRIVEN ESTIMATION OF NETWORK PORT DELAY

(71) Applicant: FUJITSU LIMITED, Kawasaki-Shi, Kanagawa (JP)

(72) Inventors: Xi Liu, Richardson, TX (US); Max Simmons, Richardson, TX (US); Calvin Wan, Richardson, TX (US); Jacky Kuo, Richardson, TX (US); Vamseedhar Reddyvariraja, Richardson, TX (US)

(73) Assignee: FUJITSU LIMITED, Kawasaki (JP)

( * ) Notice: Subject to any disclaimer, the term of this patent is extended or adjusted under 35 U.S.C. 154(b) by 88 days.

(21) Appl. No.: 15/247,473

(22) Filed: Aug. 25, 2016

(65) Prior Publication Data
US 2018/0062963 A1    Mar. 1, 2018

(51) Int. Cl.
*H04L 12/26* (2006.01)
*H04L 12/24* (2006.01)
*H04L 7/00* (2006.01)
*H04L 12/935* (2013.01)
*H04L 5/00* (2006.01)

(52) U.S. Cl.
CPC ........ *H04L 43/0852* (2013.01); *H04L 7/0041* (2013.01); *H04L 41/0631* (2013.01); *H04L 41/145* (2013.01); *H04L 43/067* (2013.01); *H04L 5/0048* (2013.01); *H04L 43/08* (2013.01); *H04L 49/30* (2013.01)

(58) Field of Classification Search
CPC ... H04L 5/0048; H04L 5/0035; H04L 5/0094; H04L 5/0023; H04L 5/0053; H04L 27/2646; H04L 7/0041; H04L 43/0852; H04L 49/30; H04L 5/0051; H04L 5/006
See application file for complete search history.

(56) References Cited

U.S. PATENT DOCUMENTS

2016/0223639 A1*  8/2016  Davydov .................. G01S 5/04
2017/0353221 A1* 12/2017  Kang ................... H04B 7/0626

* cited by examiner

Primary Examiner — Khaled Kassim
Assistant Examiner — Najeebuddin Ansari
(74) Attorney, Agent, or Firm — Baker Botts L.L.P.

(57) ABSTRACT

A computational method and system for estimating port delays in a network may use a data-driven estimation with quadratic programming based on available network path data that is already collected. In this manner, port delays for each individual port in the network may be estimated without having to measure each individual port using sensors.

14 Claims, 5 Drawing Sheets

DATA-DRIVEN ESTIMATION OF NETWORK PORT DELAY

BACKGROUND

Field of the Disclosure

The present disclosure relates to communication networks, and more specifically, to data-driven estimation of network port delay.

Description of the Related Art

A communication network may include network elements that route packets through the network. Some network elements may include a distributed architecture, wherein packet processing may be distributed among several subsystems of the network element (e.g., line cards). Thus, network elements may be modular and may include various sub-systems and sub-elements, which may include a shelf, a slot, a port, a channel, or various combinations thereof.

In particular, a network element can be abstracted as a generalized network node having ports that provide input and output paths to other ports on other nodes. Any communications network can, in turn, be represented using the node/port abstraction to make the large number of ports in the network visible.

Because the typical communications network comprises a large number of ports, the performance of each network port may be determinative for the performance and operation of network paths in the network. When the performance of a port is physically degraded, the port may exhibit packet loss or packet delay for all network paths passing through the port, which is undesirable. Therefore, the actual performance of individual ports in a communications network is an important factor in operating a communications network.

BRIEF DESCRIPTION OF THE DRAWINGS

For a more complete understanding of the present invention and its features and advantages, reference is now made to the following description, taken in conjunction with the accompanying drawings, in which.

SUMMARY

In one aspect a method for estimating network port delay times is disclosed. The method includes modeling a network in terms of edge nodes, core nodes, ports, links, and paths. In the network, edge nodes are connected to external entities and to one core node, each link connects to two nodes, the nodes comprising edge nodes or core nodes, each link connects to a node using a port at the node, and each path begins and ends at an edge node. The method may include defining a vector x as $\{x_1, x_2, x_3 \ldots, x_P\}$ for P number of total ports in the network, where $x_j$ is equal to a delay time for port j. The method may also include defining a binary matrix A having each row corresponding to a non-zero path i and each column corresponding to port j, where each element $a_{ij}$ in matrix A is zero (0) if path i does not pass through port j, is one (1) if path i does pass through port j, and matrix A has rank R corresponding to a number of linearly independent paths in matrix A. The method may further include defining a vector b as $\{b_1, b_2, b_3 \ldots, b_Q\}$ for Q number of non-zero paths in the network, where $b_i \geq 0$ is a total delay time for the i-th path given by $b_i = \sum_{j=1}^{P} a_{ij} x_j$, and combining non-differentiated ports to reduce vector x and the columns in matrix A from P to P'. When $R \geq P'$, the method may include solving a difference function F(x) given by $F(x) = \|Ax - b\|^2$ for a minimum of F(x) and correspondingly solving the vector x. The method may also include reporting the delay times in the solved vector x to a network administrator of the network.

In any of the disclosed embodiments of the method, solving the difference function F(x) may be performed using an iterative procedure. In the method, the iterative procedure may further include solving the vector x using the iterative procedure until the vector x converges, according to the equation $x_{n+1} = x_n - \lambda * \nabla F(x_n)$, in which n is an iteration counter, $\lambda$ is a positive learning rate ($\lambda > 0$), and $\nabla F(x)$ is a derivative of F(x) given by $\nabla F(x) = 2A^T(Ax - b)$, wherein $A^T$ is the transposed binary matrix A.

In any of the disclosed embodiments of the method, for a first iteration n=1, $x_n$ may be populated with plausible estimates for delay times for individual ports.

In any of the disclosed embodiments, the method may further include receiving port information from a routing module, the port information indicative of individual ports at nodes in the network, receiving path information from a path computation engine for the network, the path information indicative of nodes and ports through which the paths propagate through the network, and generating the matrix A based on the port information and the path information.

In any of the disclosed embodiments of the method, defining the vector b may further include receiving the total delay time $b_i$ from a signaling module for each of the Q number of non-zero paths.

In any of the disclosed embodiments, the method may further include, when R<P', identifying (P'-R) number of ports for which delay times will not be generated when the vector x is solved. In the method, identifying the (P'-R) number of ports may further include, for each port j, removing a column $a_j$ from matrix A to generate matrix A', and if a rank R' of matrix A' is not less than the rank R of matrix A, determining that port j is included in the (P'-R) number of ports.

In any of the disclosed embodiments, the method may further include, based on the delay times in the vector x, identifying ports with delay times greater than a threshold delay time as bad ports, and sending a service notification to a network administrator of the network, the service notification indicating the bad ports in the vector x.

Additional disclosed aspects for data-driven estimation of network port delay include a system comprising a processor configured to access non-transitory computer readable memory media, and an article of manufacture comprising non-transitory computer readable memory media storing processor-executable instructions.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget 12-1 refers to an instance of a widget class, which may be referred to collectively as widgets 12 and any one of which may be referred to generically as a widget 12.

As noted above, when the performance of a network port is physically degraded, the network port may exhibit packet loss or packet delay for all network paths passing through the network port, which is undesirable. Therefore, monitoring the performance of individual network ports in a network may be an important aspect in keeping networks operating at optimum performance.

Typically, the performance of network ports can be monitored using physical sensors, such as a pass-through device on each port, or another type of sensor. However, because of the large numbers of network ports in many communication networks, numbering in the thousands or more, using physical sensors to monitor each individual port is not economically feasible because of the resource usage involved, including the sensors, software, and manpower. Thus, physical monitoring of each individual network port is not economically scalable and, therefore, is not desirable.

As will be disclosed in further detail herein, data-driven estimation of network port delay methods may be used to determine actual delay times at individual network ports. The data-driven estimation of network port delay disclosed herein relies upon the fact that the total delay time along a network path is the sum of the delay times at each network port in the network path. Because more than one network path may pass through each individual port, the existing latency information collected at terminal nodes of each network path may be processed using quadratic programming methods to identify a delay time associated with each individual network port.

Figure 1:
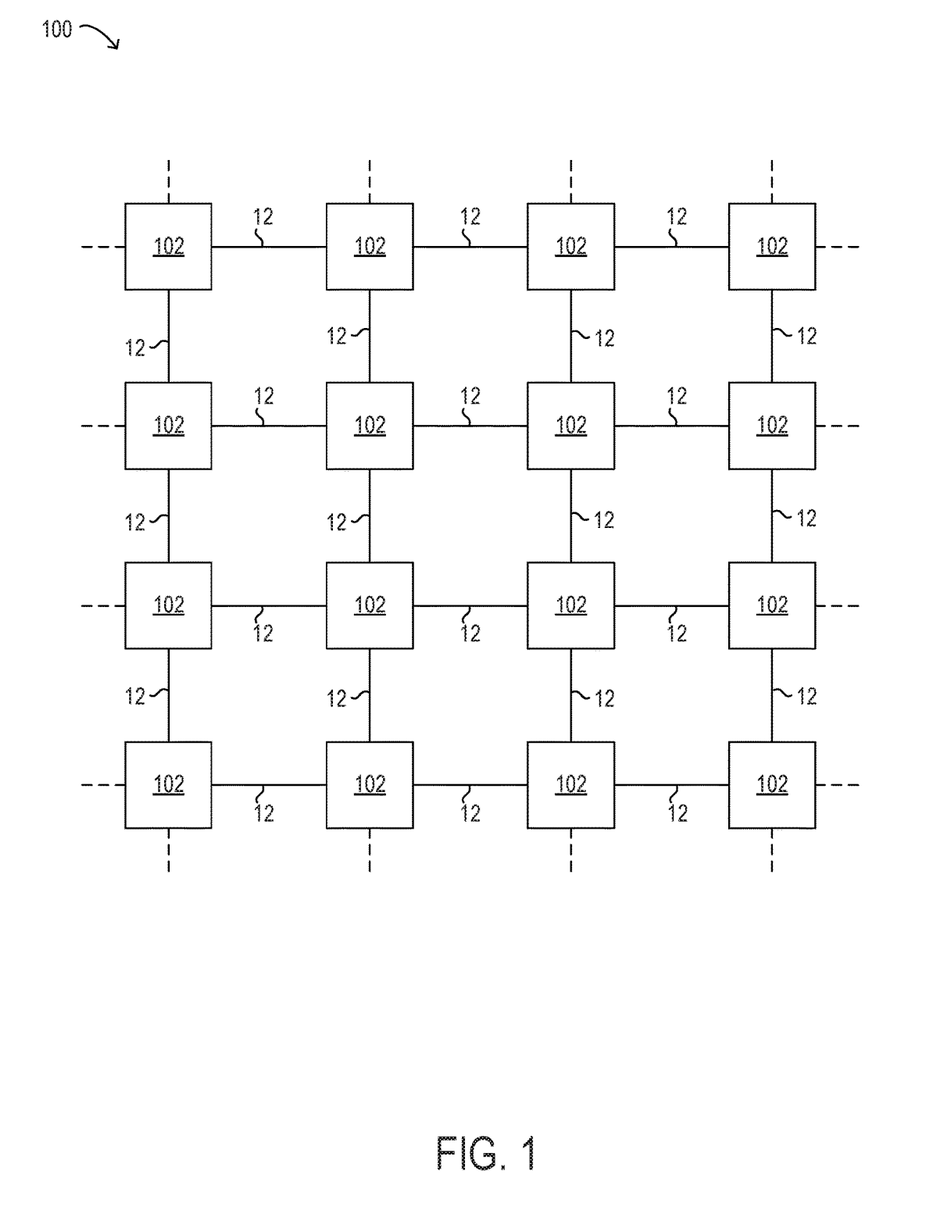
FIG. 1 is a block diagram of selected elements of an embodiment of a network.

Turning now to the drawings, FIG. 1 is a block diagram showing selected elements of an embodiment of network 100. In certain embodiments, network 100 may be an Ethernet network. Network 100 may include one or more transmission media 12 operable to transport one or more signals communicated by components of network 100. The components of network 100, coupled together by transmission media 12, may include a plurality of network elements 102. In the illustrated network 100, each network element 102 is coupled to four other nodes. However, any suitable configuration of any suitable number of network elements 102 may create network 100. Although network 100 is shown as a mesh network, network 100 may also be configured as a ring network, a point-to-point network, or any other suitable network or combination of networks. Network 100 may be used in a short-haul metropolitan network, a long-haul inter-city network, or any other suitable network or combination of networks.

Each transmission medium 12 may include any system, device, or apparatus configured to communicatively couple network devices 102 to each other and communicate information between corresponding network devices 102. For example, a transmission medium 12 may include an optical fiber, an Ethernet cable, a T1 cable, a WiFi signal, a Bluetooth signal, or other suitable medium.

Network 100 may communicate information or "traffic" over transmission media 12. As used herein, "traffic" means information transmitted, stored, or sorted in network 100. Such traffic may comprise optical or electrical signals configured to encode audio, video, textual, and/or any other suitable data. The data may also be transmitted in a synchronous or asynchronous manner, and may be transmitted deterministically (also referred to as 'real-time') and/or stochastically. Traffic may be communicated via any suitable communications protocol, including, without limitation, the Open Systems Interconnection (OSI) standard and Internet Protocol (IP). Additionally, the traffic communicated via network 100 may be structured in any appropriate manner including, but not limited to, being structured in frames, packets, or an unstructured bit stream.

Each network element 102 in network 100 may comprise any suitable system operable to transmit and receive traffic. In the illustrated embodiment, each network element 102 may be operable to transmit traffic directly to one or more other network elements 102 and receive traffic directly from the one or more other network elements 102. Network elements 102 will be discussed in more detail below with respect to FIG. 2.

Modifications, additions, or omissions may be made to network 100 without departing from the scope of the disclosure. The components and elements of network 100 described may be integrated or separated according to particular needs. Moreover, the operations of network 100 may be performed by more, fewer, or other components.

In operation, as will be described in further detail herein, network elements 102 may comprise network ports for coupling to other network elements 102. Network ports in network elements 102 responsible for packet loss or delay in network 100 may be identified using the data-driven estimation of network port delay methods described herein.

Figure 2:
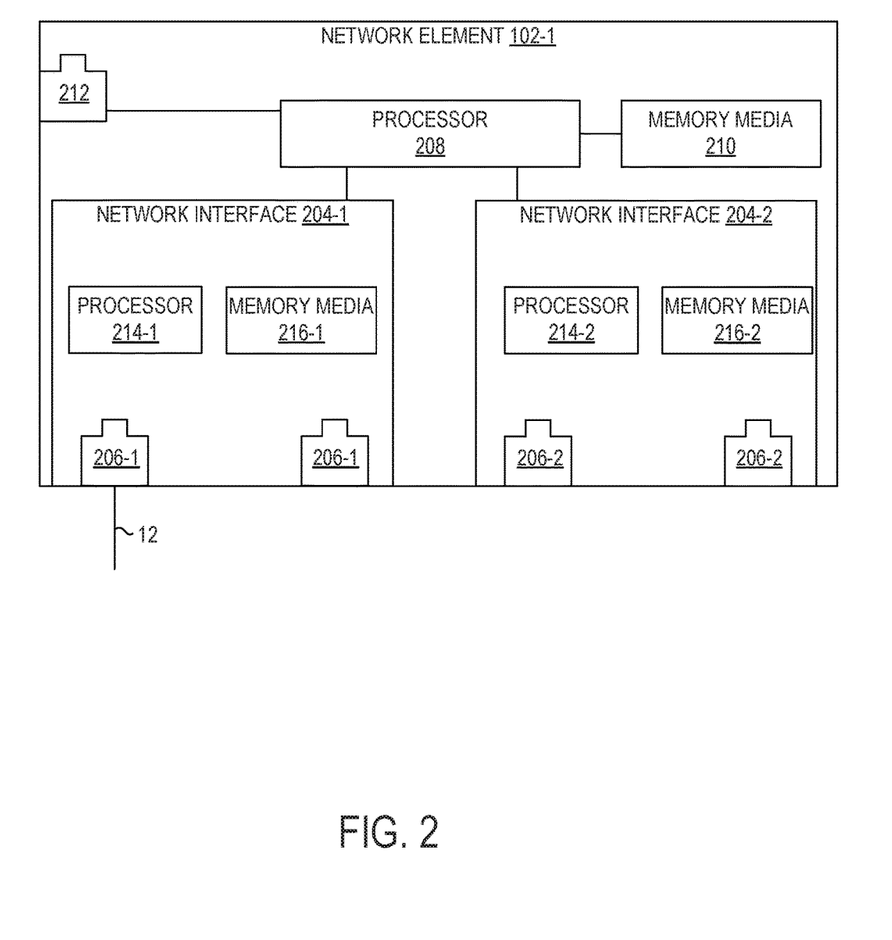
FIG. 2 is a block diagram of selected elements of an embodiment of a network element.

Referring now to FIG. 2, a block diagram of selected elements of an embodiment of network element 102-1, which is represented as a particular embodiment of network elements 102 for descriptive purposes, is illustrated. Network element 102-1, as shown, includes processor 208 and memory media 210, and external port 212, along with network interface 204-1 having ports 206-1 and network interface 204-2 having ports 206-2. External port 212 may be used by processor 208 to communicate with neighbor network elements (see FIG. 1).

As depicted in FIG. 2, each network element 102 may include processor 208 and memory media 210 that may store instructions executable by processor 208. Processor 208 may include a single processing unit (e.g., a core) or may include multiple processing units (not shown). In certain embodiments, processor 208 may represent a multi-processor subsystem in which each individual processor includes one or more processing units. The individual processors or processing units may provide processing resources, such as a processing frequency, messaging, instruction queuing, memory caching, virtual memory, among others, to process instructions and code. As shown, memory media 210 may represent volatile, non-volatile, fixed, or removable media, and may be implemented using magnetic or semiconductor memory. Memory media 210 is capable of storing instructions (i.e., code executable by processor 208) and data. Memory media 210, or at least a portion of contents of memory media 210, may be implemented as an article of manufacture comprising non-transitory computer readable memory media storing processor-executable instructions. Memory media 210 may store instructions including an operating system (OS), which may be any of a variety of operating systems, such as a UNIX variant, LINUX, a Microsoft Windows® operating system, or a different operating system.

In FIG. 2, network elements 102 are shown including at least one network interface 204, which provides a plurality of ports 206 that receive a corresponding transmission media 12 (see also FIG. 1). Ports 206 and transmission media 12 may represent galvanic or optical network connections. Each network interface 204 may include any suitable system, apparatus, or device configured to serve as an interface between a network element 102 and transmission medium 12. Each network interface 204 may enable its associated network element 102 to communicate with other network elements 102 using any of a variety of transmission protocols and standards. Network interface 204 and its various components may be implemented using hardware, software, or any combination thereof. In certain embodiments, network interfaces 204 may include a network interface card. In various embodiments, network interfaces 204 may include a line card. Each port 206 may include a system, device or apparatus configured to serve as a physical interface between corresponding transmission medium 12 and network interface 204. In some embodiments, port 206 may comprise an Ethernet port. Although in FIG. 2 network interfaces 204 are shown with 2 instances of ports 206 for descriptive clarity, in different embodiments, network interfaces 204 may be equipped with different numbers of ports 206 (e.g., 4, 6, 8, 16 ports, etc.).

As shown in FIG. 2, network interfaces 204 may include respective processors 214 and memory media 216, which may store and execute instructions and may be implemented in a similar manner as described above with respect to processor 208 and memory media 210, respectively. In various embodiments, processors 214 may execute internal instructions and operations, such as for packet routing and forwarding, and may be under control or supervision of processor 208. Furthermore, processor 208 and processor(s) 214, along with various internal and external network ports included in network element 102, may represent at least one local domain that is configured at network element 102. In some embodiments, the local domains include at least one virtual local area network (VLAN) domain.

In various embodiments, network element 102 may be configured to receive data and route such data to a particular network interface 204 and port 206 based on analyzing the contents of the data or based on a characteristic of a signal carrying the data (e.g., a wavelength or modulation of the signal). In certain embodiments, network element 102 may include a switching element (not shown) that may include a switch fabric (SWF).

Figure 3:
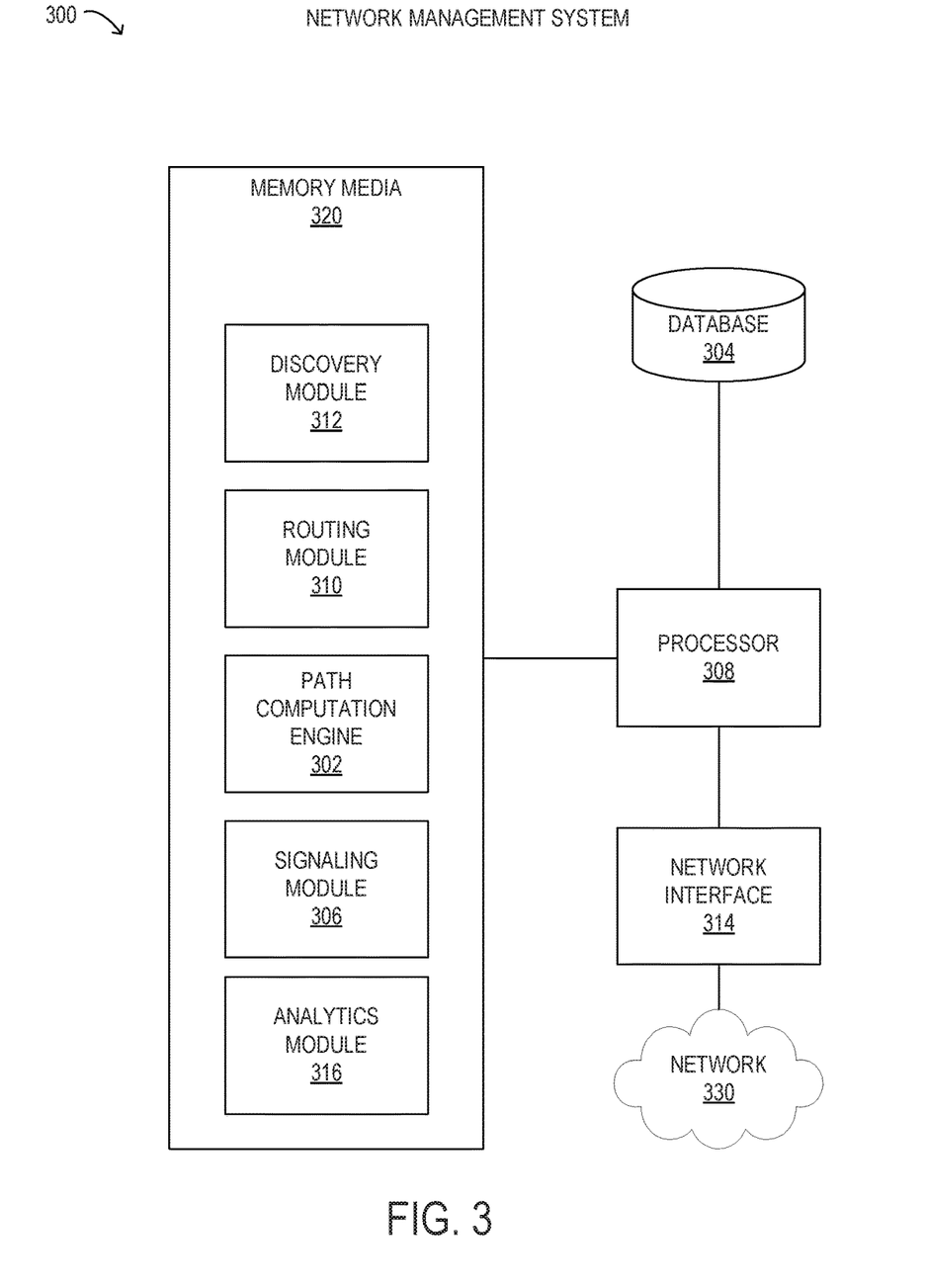
FIG. 3 is a block diagram of selected elements of a network management system.

Referring now to FIG. 3, a block diagram of selected elements of an embodiment of network management system 300 for implementing control plane functionality in optical networks, such as, for example, in optical transport network 101 (see FIG. 1), is illustrated. A control plane may include functionality for network intelligence and control and may comprise applications that support the ability to establish network services, including applications or modules for discovery, routing, path computation, and signaling, as will be described in further detail. The control plane applications executed by network management system 300 may work together to automatically establish services within the optical network. Discovery module 312 may discover local links connecting to neighbors. Routing module 310 may broadcast local link information to optical network nodes while populating database 304. When a request for service from the optical network is received, path computation engine 302 may be called to compute a network path using database 304. This network path may then be provided to signaling module 306 to establish the requested service. An analytics module 316 may perform various analyses on network data, such as network data collected by control plane 300 and stored using database 304, among other network data.

As shown in FIG. 3, network management system 300 includes processor 308 and memory media 320, which may store executable instructions (i.e., executable code) that may be executable by processor 308, which has access to memory media 320. Processor 308 may execute instructions that cause network management system 300 to perform the functions and operations described herein. For the purposes of this disclosure, memory media 320 may include non-transitory computer-readable media that stores data and instructions for at least a period of time. Memory media 320 may comprise persistent and volatile media, fixed and removable media, and magnetic and semiconductor media. Memory media 320 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and flash memory; non-transitory media, or various combinations of the foregoing. Memory media 320 is operable to store instructions, data, or both. Memory media 320 as shown includes sets or sequences of instructions that may represent executable computer programs, namely, path computation engine 302, signaling module 306, discovery module 312, routing module 310, and analytics module 316. In some embodiments, analytics module 316, in conjunction with path computation engine 302, signaling module 306, discovery module 312, and routing module 310, may represent instructions or code for implementing various algorithms according to the present disclosure.

Also shown included with network management system 300 in FIG. 3 is network interface 314, which may be a suitable system, apparatus, or device operable to serve as an interface between processor 308 and network 330. Network interface 314 may enable network management system 300 to communicate over network 330 using a suitable transmission protocol or standard. In some embodiments, network interface 314 may be communicatively coupled via network 330 to a network storage resource. In some embodiments, network 330 represents at least certain portions of network 100. In certain embodiments, network 330 may include at least certain portions of a public network, such as the Internet. Network 330 may be implemented using hardware, software, or various combinations thereof.

In certain embodiments, control plane 300 may be configured to interface with a person (i.e., a user) and receive data about the signal transmission path. For example, control plane 300 may also include and/or may be coupled to one or more input devices or output devices to facilitate receiving data about the signal transmission path from the user and outputting results to the user. The one or more input and output devices (not shown) may include, but are not limited to, a keyboard, a mouse, a touchpad, a microphone, a display, a touchscreen display, an audio speaker, or the like. Alternately or additionally, control plane 300 may be configured to receive data about the signal transmission path from a device such as another computing device or a network element (not shown in FIG. 3).

As shown in FIG. 3, in some embodiments, discovery module 312 may be configured to receive data concerning a signal transmission path in a network and may be responsible for discovery of neighbors and links between neighbors. In other words, discovery module 312 may send discovery messages according to a discovery protocol, and may receive data about the signal transmission path. In some embodiments, discovery module 312 may determine features, such as, but not limited to, media type; media length; number and type of components; data rate; modulation format of the data; input power of an optical signal; number of optical signal carrying wavelengths (i.e., channels); channel spacing; traffic demand; and network topology, among others.

As shown in FIG. 3, routing module 310 may be responsible for propagating link connectivity information to various nodes within a network, such as network 100. In particular embodiments, routing module 310 may populate database 304 with resource information to support traffic engineering, which may include link bandwidth availability. Accordingly, database 304 may be populated by routing module 310 with information usable to determine a network topology of a network.

Path computation engine 302 may be configured to use the information provided by routing module 310 to database 304 to determine transmission characteristics of the signal transmission path. The transmission characteristics of the signal transmission path may provide insight on how transmission degradation factors may affect the signal transmission path. When the network is an optical network, the transmission degradation factors may include, for example: chromatic dispersion (CD), nonlinear (NL) effects, polarization effects, such as polarization mode dispersion (PMD) and polarization dependent loss (PDL), amplified spontaneous emission (ASE) and/or others, which may affect optical signals within an optical signal transmission path. To determine the transmission characteristics of the signal transmission path, path computation engine 302 may consider the interplay between various transmission degradation factors. In various embodiments, path computation engine 302 may generate values for specific transmission degradation factors. Path computation engine 302 may further store data describing the signal transmission path in database 304.

In FIG. 3, signaling module 306 may provide functionality associated with setting up, modifying, and tearing down end-to-end networks services in network 100. For example, when an ingress node in the optical network receives a service request, control plane 300 may employ signaling module 306 to request a network path from path computation engine 302 that may be optimized according to different criteria, such as bandwidth, cost, etc. When the desired network path is identified, signaling module 306 may then communicate with respective nodes along the network path to establish the requested network services. In different embodiments, signaling module 306 may employ a signaling protocol to propagate subsequent communication to and from nodes along the network path.

In FIG. 3, analytics module 316 may provide functionality to access various network information and to execute analytical algorithms for various purposes and directed to different stakeholders. For example, analytics module 316 may perform data-driven estimation of network port delay to identify network ports responsible for packet loss or delay, as disclosed herein. It is noted that in some embodiments, analytics module 316 may execute on a generic computer system represented by processor 308 and memory media 320 in FIG. 3. Any generic computer system may execute analytics module 316 without executing any one or more of discovery module 312, routing module 310, path computation engine 302, and signaling module 316. In particular embodiments, analytics module 316 may be executed on a generic computer executing a software-defined networking (SDN) controller (not shown).

Figure 4:
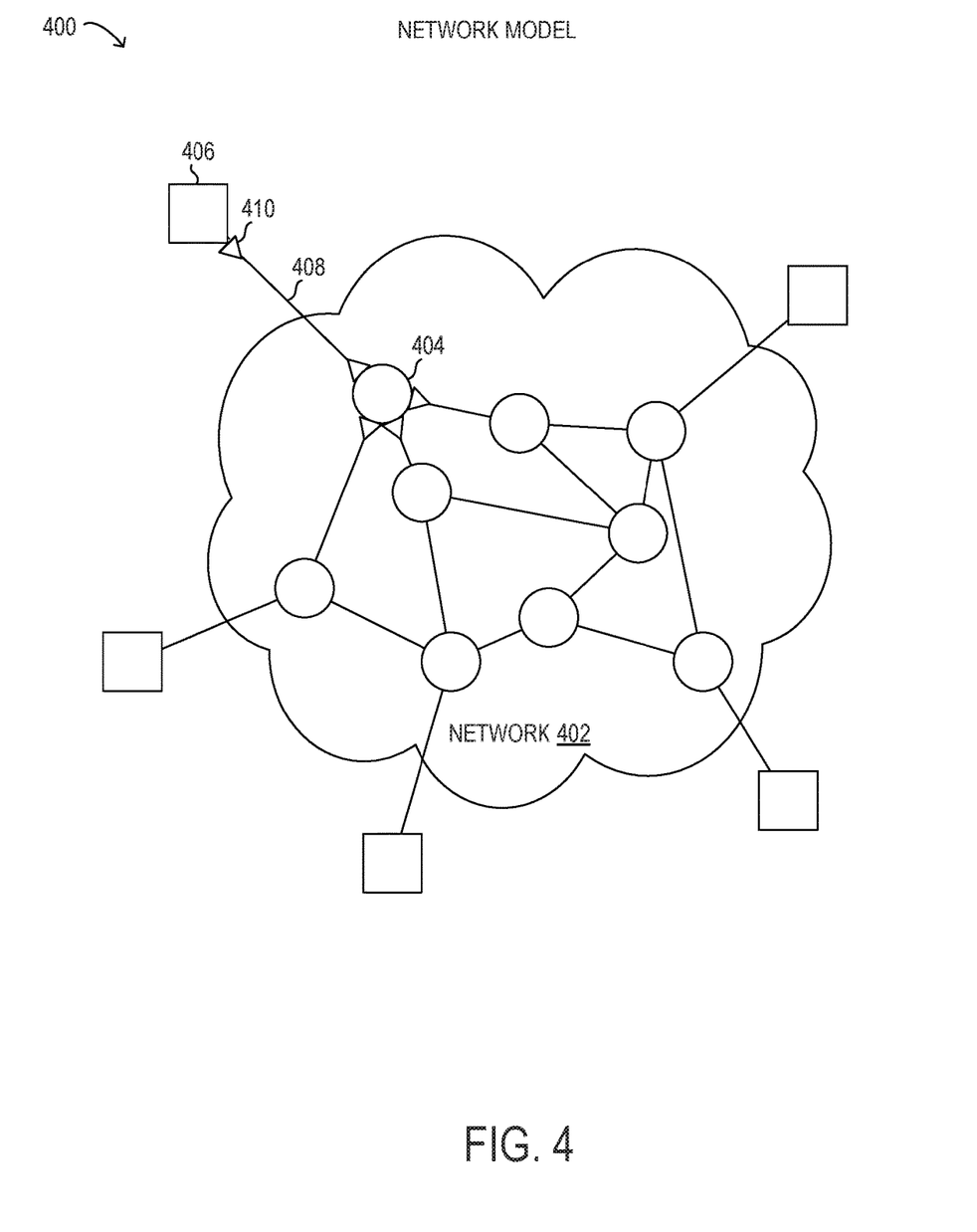
FIG. 4 is a block diagram of selected elements of a network model.

Referring now to FIG. 4, a block diagram of selected elements of an embodiment of a network model 400 is illustrated. Network model 400 shows how nodes 404, 406, ports 410, and links 408 may be modeled to perform data-driven estimation of network port delay, as disclosed herein. Network model 400 may represent an embodiment of network 100 (see FIG. 1). Network 402 may represent a core network in network model 400.

In general, a communications network may be modeled using edge nodes 406 (shown as squares in FIG. 4) and core nodes 404 (shown as circles in FIG. 4) connected by network links 408. At each intersection of link 408 with either edge node 406 or core node 408, it may be assumed that an individual network port 410 is present and dedicated to the intersection. Certain network ports 410 are shown as triangles for edge node 406, link 408, and core node 404 in FIG. 4 for descriptive clarity, but it will be understood that each core node 404 and edge node 406 have a port 410 at the intersection of link 408 to the node. In other words, each of edge nodes 406 and core nodes 404 may be comprised of ports 410 that are available for interconnection with network links 408. In network model 400, edge nodes 406 and core nodes 404 may have other ports (unpopulated ports) in addition to ports 410 populated by network links 408.

Edge nodes 406, which are at the boundary of network model 400, may be connected to customer equipment or to other networks, which are not shown in FIG. 4. As used herein, a "network path" begins on a first edge node 406 that is a source node and ends on a second edge node 406 that is a destination node In some embodiments, the source node and the destination node for a network path may be the same nodes.

Core nodes 404, which are shown in network 402, may represent internal nodes where no customer equipment is connected. As used herein, core nodes 404 are not source nodes or destination nodes (terminal nodes) for a network path.

In FIG. 4, a network path (not shown) may be defined in network model 400 as any path beginning and ending on edge nodes 406. Thus, as is evident from network model 400, numerous different network paths may be defined from any one of edge nodes 406 to any other edge node 406, and passing through different numbers of core nodes 404. At each edge node 406, the network path may use one port 410, an output port for edge node 406 at the source of the network path, or an input port for edge node 406 at the destination of the network path. Additionally, each core node 404 through which a network path passes may use two ports 410 for the network path, an input port and an output port. Furthermore, multiple network paths may include a given core node 404 and may accordingly pass through the same port.

Based on the above characteristics of network model 400, data-driven estimation of network port delay are described below in further detail. Based on the fact that the total delay for a network path is the sum of delays exhibited at each network port along the network path (see Equation 1), a delay for individual ports 410 may be determined. For example, an actual delay is recorded for each network path at edge nodes 406 for the network path, the recorded information can be used to determine a delay time for individual ports 410, as described below. Based on the delay times so determined for each individual port, it may be ascertained that certain ports are bad ports, for example, by comparing the delay time to a threshold value and determining when the delay time is an abnormally large value. In some embodiments, a service notification may be sent to a network administrator of the network, the service notification indicating the bad ports so determined. In some embodiments, a service notification, such as an alarm for a network node, may be directly sent to each bad port so determined.

Based on network model 400, let x define a vector $\{x_1, x_2, x_3 \ldots, x_P\}$ for P number of total ports in network model 400, where $x_j$ is a delay for the j-th network port.

Additionally, let b define a vector $\{b_1, b_2, b_3 \ldots, b_Q\}$ for Q number of non-zero paths specified from network model 400, where $b_i \geq 0$ is the total delay for the i-th path. Among the Q number of non-zero paths, we can define an R number of linearly independent path, such that $R \leq Q$.

Further, let A define a binary matrix in which each row i corresponds to a non-zero path and in which each column j corresponds to the j-th network port. Accordingly, matrix A may have width P and a length Q corresponding to the number of non-zero paths specified. Furthermore, matrix A may have a rank given by R, the number of linearly independent paths (rows). For each element $a_{ij}$ in matrix A, let $a_{ij}=0$ if path i does not pass through port j, and let $a_{ij}=1$ if path i does pass through port j.

As noted above, the total delay $b_i$ for the i-th path is defined as the sum of the delay for ports along the path and is given by Equation 1.

$$b_i = \sum_{j=1}^{P} a_{ij} x_j \qquad \text{Equation (1)}$$

Furthermore, when a first port and a second port are linked such that any path that passes through the first port also passes through the second port, and any path that passes through the second port also passes through the first port, the first port and the second port may be defined as ports that cannot be differentiated (or are non-differentiated ports). In this case, column j for the first port and for the second port will be identical, signifying that the first port and the second port are two ports on both ends of a link. In such a case, the columns j for the first port and the second port may be combined into a single column that yields a sum delay for the network link between the first port and the second port. After certain non-differentiated ports are combined in matrix A, the corresponding ports may also be combined in vector x, such that P is reduced by the number of non-differentiated ports to a value P', which represents the actual number of unknown values being solved for. Thus, after the non-differentiated ports are combined, matrix A has P' number of columns, while vector x has a length of P'.

Using matrix A and vector b, a quadratic programming method will now be presented that solves for individual values for port delay in vector x.

First, before the quadratic programming is performed, it will be assumed that the non-differentiated ports have been combined, as described above, such that matrix A has P' number of columns and Q number of rows corresponding to the number of non-zero paths. Matrix A has rank R, which is the number of linearly independent path vectors in matrix A, such that $R \leq Q$.

Then, rank R of matrix A may be compared with P', the number of unknown port/link delay values. When $R \geq P'$, then the quadratic programming described below may be performed.

When $R<P'$, then the number of unknown values P' cannot be determined. In other words, the solved vector x will not generate delay times for (P'-R) number of ports. In this case, more known values can be added, and specifically, an additional (P'-R) number of known values can be added. For example, in one embodiment, an indication may be generated that an additional (P'-R) number of paths should be added to matrix A in order to solve for the number of unknown values P'. In another example embodiment, an indication may be generated that an additional (P'-R) number of time delay measurements should be added for specific ports, in order to reduce the number of unknown values being solved for. Furthermore, the individual specific ports for which time delay measurements should be added may be identified by removing individual columns from matrix A to generate matrix A', for example by removing each column individually in an iterative manner. In the iteration of removing individual columns $a_j$ to generate matrix A', a rank R' of matrix A' may be determined. When rank R' of matrix A' is not reduced as compared to rank R of matrix A, it can be deduced that the removed column $a_j$ resulting in matrix A' corresponds to a port j for which a time delay measurement should be added. This procedure may be repeated until $R \geq P'$.

When $R \geq P'$, Equation 2 defines a quadratic function relating to a difference between the unknown values in vector x and the known values in vector b.

$$F(x) = \|Ax - b\|^2 \qquad \text{Equation (2)}$$

In Equation 2, $x \geq 0$, such that vector x includes only positive or zero values. Then, using quadratic programming an iterative solution based on gradient descent may be used to solve for x in Equation 2, as given by Equations 3 and 4.

$$x_{n+1} = x_n - \lambda * \nabla F(x_n) \qquad \text{Equation (3)}$$

In Equation 3:
n is an iteration counter;
$\lambda$ is a positive learning rate ($\lambda > 0$); and
$\nabla F(x)$ is a derivative of $F(x)$ given by Equation 4.

$$\nabla F(x) = 2A^T (Ax - b) \qquad \text{Equation (4)}$$

In Equation 4, $A^T$ is the transposed matrix A.

For example, for the initial iteration (n=1), the delay values $x_j$ may be populated with any random values, though it may be more efficient when reasonable estimates for the delay values are used for the initial iteration. For the value of $\lambda$, a small positive value, such as 0.1, 0.2, or 0.3, as non-limiting examples, may be used in order to find the convergent solution to Equation 3. Then, Equations 3 and 4 are used to update the delay values $x_j$ in vector x until convergence is reached, and vector x does not change with further iterations. At this point, vector x will output the P' number of delay values for individual ports that can be differentiated and individual links where the ports for the links are non-differentiated, as explained above.

Various simulations have been performed to validate the data-driven estimation of network port delay described herein. For example, in a network model having 10 nodes, 48 ports, 10% core nodes of all nodes, 100% of all port delays may be obtained with 100 network paths. The simulation results demonstrate the viability and desirability of the data-driven estimation of network port delay described herein.

The data-driven estimation of network port delay described herein may provide a fast and efficient method for determining individual network port delays that does not rely upon measurement using sensors at each port and relies on existing and available data. The data-driven estimation of network port delay described herein may enable network operators to quickly and reliably determine individual network port delays and may reduce or eliminate resources used in trying to diagnose or find bad ports having excessively large delays. The data-driven estimation of network port delay described herein may provide a computationally tractable method that can be economically implemented and scaled to any desired network complexity or size.

Figure 5:
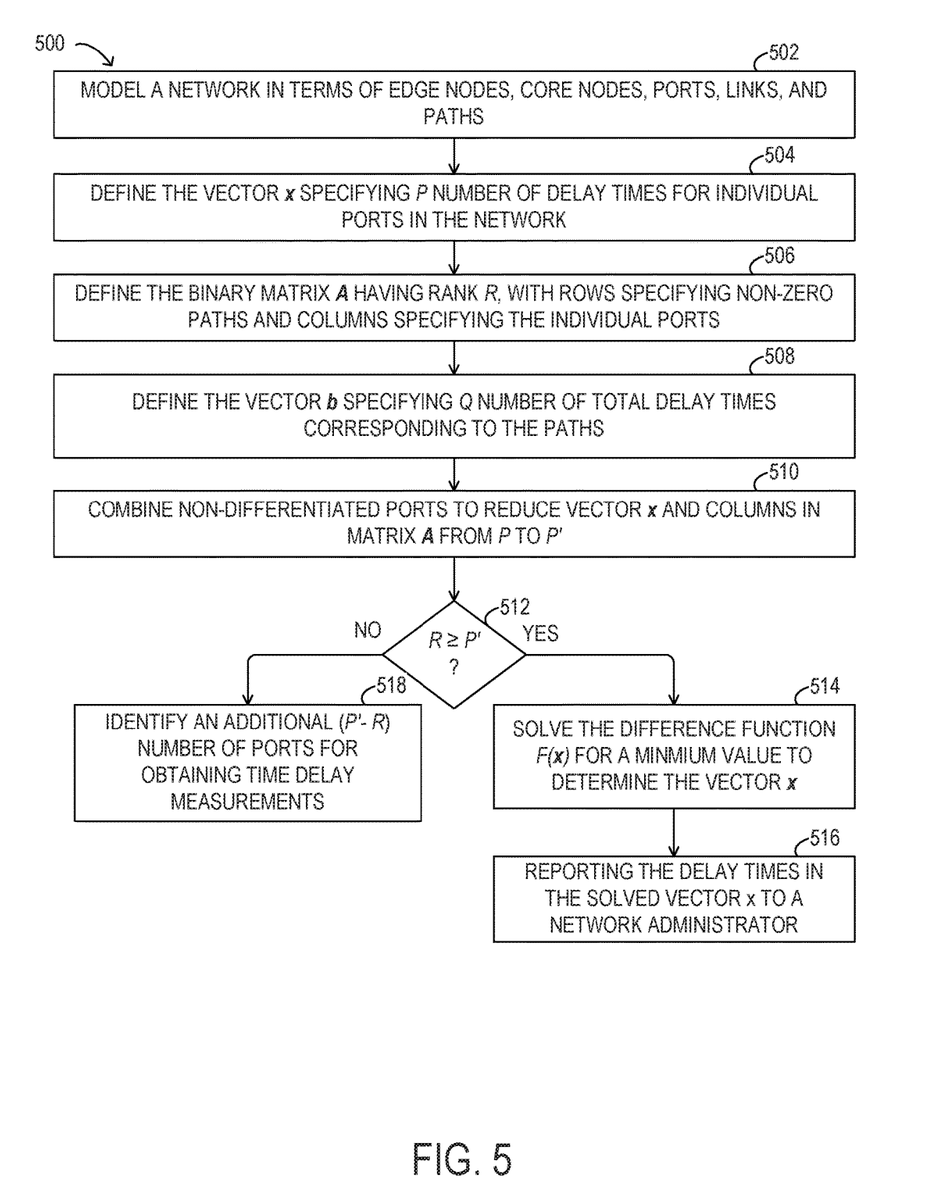
FIG. 5 is a flow chart depicting selected elements of an embodiment of a method for data-driven estimation of network port delay.

Turning now to FIG. 5, a block diagram of selected elements of an embodiment of a method 500 for data-driven estimation of network port delay, as described herein. Method 500 may be performed using network element 102 (see FIGS. 1 and 2). In various embodiments, method 500 may be executed by analytics module 316 (see FIG. 3). It is noted that certain operations described in method 500 may be optional or may be rearranged in different embodiments.

In FIG. 5, method 500 may begin at step 502 by modeling a network in terms of edge nodes, core nodes, ports, links, and paths. In step 502, the modeling may specify that: edge nodes are connected to external entities and to one core node; each link connects to two nodes, the nodes comprising edge nodes or core nodes; each link connects to a node using a port at the node; and each path begins at a first edge node and ends at a second edge node different from the first edge node. At step 504, the vector x is defined specifying P number of delay times for individual ports in the network. At step 506, the binary matrix A is defined having rank R with rows specifying non-zero paths and columns specifying the individual ports. At step 508, the vector b is defined specifying Q number of total delay times corresponding to the paths. At step 510, non-differentiated ports may be combined to reduce vector x and columns in matrix A from P to P'. At step 512, a decision is made whether R≥P'. When the result of R≥P' is YES, at step 514, the difference function F(x) is solved for a minimum value to determine the vector x. Step 514 may involve the quadratic programming and iterative method described with respect to Equations 2 through 4 above. At step 516, the delay times in the solved vector x may be reported to a network administrator. When the result of R≥P' is NO, at step 518, an additional (P'−R) number of ports may be identified for obtaining time delay measurements. In some embodiments, method 500 may loop back to step 510 after step 518.

As disclosed herein, a computational method and system for estimating port delays in a network may use a data-driven estimation with quadratic programming based on available network path data that is already collected. In this manner, port delays for each individual port in the network may be estimated without having to measure each individual port using sensors.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for estimating network port delay times, the method comprising:
    modeling a network including edge nodes, core nodes, ports, links, and paths wherein:
        edge nodes are connected to external entities and to one core node;
        each link connects to two nodes, the nodes comprising edge nodes or core nodes;
        each link connects to each node of the nodes using a port at the node; and
        each path begins and ends at an edge node of the edge nodes;
    defining a vector x as $\{x_1, x_2, x_3 \ldots, x_P\}$ for P number of total ports in the network, wherein $x_j$ is equal to a delay time for port j;
    defining a binary matrix A having each row corresponding to a non-zero path i and each column corresponding to port j, wherein each element $a_{ij}$ in matrix A is zero (0) if path i does not pass through port j, is one (1) if path i does pass through port j, and wherein matrix A has rank R corresponding to a number of linearly independent paths in matrix A;
    defining a vector b as $\{b_1, b_2, b_3 \ldots, b_Q\}$ for Q number of non-zero paths in the network, wherein $b_i \geq 0$ is a total delay time for the i-th path given by $b_i = \Sigma_{j=1}^{P} a_{ij} x_j$;
    combining non-differentiated ports to reduce vector x and the columns in matrix A from P to P';
    when R≥P', solving a difference function F(x) given by $F(x) = \|Ax - b\|^2$ for a minimum of F(x) and correspondingly solving the vector x;
    reporting the delay times in the solved vector x to a network administrator of the network;
    identifying ports with delay times greater than a threshold delay time as bad ports based on the delay times in the solved vector x; and
    sending a service notification to the network administrator of the network, the service notification indicating the bad ports in the solved vector x.

2. The method of claim 1, wherein solving the difference function F(x) is performed using an iterative procedure, the iterative procedure further comprising:
    solving the vector x using the iterative procedure until the vector x converges, according to the equation
    $$x_{n+1} = x_n - \lambda * \nabla F(x_n)$$
    wherein n is an iteration counter, λ is a positive learning rate (λ>0), and ∇F(x) is a derivative of F(x) given by $\nabla F(x) = 2A^T(Ax - b)$, wherein $A^T$ is the transposed binary matrix A.

3. The method of claim 2, wherein for a first iteration n=1, $x_n$ is populated with plausible estimates for delay times for individual ports.

4. The method of claim 1, further comprising:
    receiving port information from a routing module, the port information indicative of individual ports at nodes in the network;
    receiving path information from a path computation engine for the network, the path information indicative of nodes and ports through which the paths propagate through the network; and
    generating the matrix A based on the port information and the path information.

5. The method of claim 1, wherein defining the vector b further comprises:
    receiving the total delay time $b_i$ from a signaling module for each of the Q number of non-zero paths.

6. The method of claim 1, further comprising:
    when R<P', identifying (P'−R) number of ports for which delay times will not be generated when the vector x is solved.

7. The method of claim 6, wherein identifying the (P'−R) number of ports further comprises:
    for each port j, removing a column $a_j$ from matrix A to generate matrix A'; and
    if a rank R' of matrix A' is not less than the rank R of matrix A, determining that port j is included in the (P'−R) number of ports.

8. A system comprising a processor configured to access non-transitory computer readable memory media storing instructions executable by the processor for:

modeling a network including edge nodes, core nodes, ports, links, and paths wherein:
   edge nodes are connected to external entities and to one core node;
   each link connects to two nodes, the nodes comprising edge nodes or core nodes;
   each link connects to each node of the nodes using a port at the node; and
   each path begins and ends at an edge node of the edge nodes;
defining a vector x as $\{x_1, x_2, x_3 \ldots, x_P\}$ for P number of total ports in the network, wherein $x_j$ is equal to a delay time for port j;
defining a binary matrix A having each row corresponding to a non-zero path i and each column corresponding to port j, wherein each element $a_{ij}$ in matrix A is zero (0) if path i does not pass through port j, is one (1) if path i does pass through port j, and wherein matrix A has rank R corresponding to a number of linearly independent paths in matrix A;
defining a vector b as $\{b_1, b_2, b_3 \ldots, b_Q\}$ for Q number of non-zero paths in the network, wherein $b_i \geq 0$ is a total delay time for the i-th path given by $b_i = \Sigma_{j=1}^{P} a_{ij} x_j$ ;
combining non-differentiated ports to reduce vector x and the columns in matrix A from P to P';
when $R \geq P'$, solving a difference function F(x) given by $F(x) = \|Ax-b\|^2$ for a minimum of F(x) and correspondingly solving the vector x;
reporting the delay times in the solved vector x to a network administrator of the network;
identifying ports with delay times greater than a threshold delay time as bad ports based on the delay times in the solved vector x; and
sending a service notification to the network administrator of the network, the service notification indicating the bad ports in the solved vector x.

9. The system of claim 8, wherein solving the difference function F(x) is performed using an iterative procedure, the iterative procedure further comprising:

solving the vector x using the iterative procedure until the vector x converges, according to the equation $$x_{n+1} = x_n - \lambda * \nabla F(x_n)$$

wherein n is an iteration counter, $\lambda$ is a positive learning rate ($\lambda > 0$), and $\nabla F(x)$ is a derivative of F(x) given by $\nabla F(x) = 2A^T(Ax-b)$, wherein $A^T$ is the transposed binary matrix A.

10. The system of claim 9, wherein for a first iteration n=1, $x_n$ is populated with plausible estimates for delay times for individual ports.

11. The system of claim 8, further comprising instructions for:
   receiving port information from a routing module, the port information indicative of individual ports at nodes in the network;
   receiving path information from a path computation engine for the network, the path information indicative of nodes and ports through which the paths propagate through the network; and
   generating the matrix A based on the port information and the path information.

12. The system of claim 8, wherein defining the vector b further comprises:
   receiving the total delay time $b_i$ from a signaling module for each of the Q number of non-zero paths.

13. The system of claim 8, further comprising instructions for:
   when R<P', identifying (P'-R) number of ports for which delay times will not be generated when the vector x is solved.

14. The method of claim 13, wherein identifying the (P'-R) number of ports further comprises:
   for each port j, removing a column $a_j$ from matrix A to generate matrix A'; and
   if a rank R' of matrix A' is not less than the rank R of matrix A, determining that port j is included in the (P'-R) number of ports.

* * * * *